(12) United States Patent
Braissant et al.

(10) Patent No.: US 10,078,004 B2
(45) Date of Patent: Sep. 18, 2018

(54) SYSTEM AND METHOD FOR MONITORING WEIGHT OF MATERIAL IN RESERVOIR

(71) Applicant: SICPA HOLDING SA, Prilly (CH)

(72) Inventors: Marc Braissant, Pomy (CH); Xavier Cedric Raemy, Belmont-sur-Lausanne (CH); Nicola Duca, Monthey (CH); Carine Bondallaz, La Tour-de-Peilz (CH); Thomas Gueritault, Prilly (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 14/439,397

(22) PCT Filed: May 17, 2013

(86) PCT No.: PCT/EP2013/060302
§ 371 (c)(1),
(2) Date: Apr. 29, 2015

(87) PCT Pub. No.: WO2014/067672
PCT Pub. Date: May 8, 2014

(65) Prior Publication Data
US 2015/0247753 A1 Sep. 3, 2015

Related U.S. Application Data

(60) Provisional application No. 61/720,080, filed on Oct. 30, 2012.

(51) Int. Cl.
*B67D 1/00* (2006.01)
*B67D 7/14* (2010.01)
(Continued)

(52) U.S. Cl.
CPC .......... *G01G 17/04* (2013.01); *B41J 2/17523* (2013.01); *B41J 2/17546* (2013.01);
(Continued)

(58) Field of Classification Search
CPC ... G01G 17/04; B41J 2/17523; B41J 2/17546; B41J 2/17553; B41J 2/17566
(Continued)

(56) References Cited

U.S. PATENT DOCUMENTS 5,731,824 A * 3/1998 Kneezel ............... B41J 2/17513
347/7
6,329,013 B1 * 12/2001 Putt ..................... B05C 11/1034
222/1
(Continued)

FOREIGN PATENT DOCUMENTS

DE 40 02 255 8/1991
JP 2000103080 4/2000
(Continued)

OTHER PUBLICATIONS

Japanese Office Action in counterpart Japanese Application No. P2015-538333 dated Jan. 24, 2017 (and English language translation).

*Primary Examiner* — Jeremy W Carroll
(74) *Attorney, Agent, or Firm* — Muncy, Geissler, Olds & Lowe, P.C.

(57) ABSTRACT

The present invention provides a way to monitor using a weight sensor to a high degree of precision the rate of material consumption from a reservoir while in operation by alleviating perturbations due to extraneous forces exerted on the reservoir by the connecting tubes and conduits that carry the material and transmit electrical signals between the reservoir and the other components of the dispensing system.

21 Claims, 6 Drawing Sheets

(51) Int. Cl.
   *G01G 17/04*   (2006.01)
   *B41J 2/175*   (2006.01)
   *G01G 11/08*   (2006.01)
   *G01G 17/06*   (2006.01)

(52) U.S. Cl.
   CPC ....... *B41J 2/17553* (2013.01); *B41J 2/17566* (2013.01); *G01G 11/086* (2013.01); *G01G 17/06* (2013.01); *Y10T 29/49002* (2015.01)

(58) Field of Classification Search
   USPC .................................................. 222/58; 347/7
   See application file for complete search history.

(56)         References Cited

U.S. PATENT DOCUMENTS

| 7,513,857 | B2* | 4/2009 | Gueller | G01N 35/0099 |
| | | | | 222/504 |
| 7,770,448 | B2* | 8/2010 | Misra | G01G 23/3728 |
| | | | | 141/83 |
| 8,444,351 | B2* | 5/2013 | Volonte | B05B 7/1404 |
| | | | | 222/148 |
| 2002/0196316 | A1 | 12/2002 | Nakamura | |
| 2006/0127153 | A1 | 6/2006 | Menchik et al. | |
| 2007/0020095 | A1 | 1/2007 | Dierksmeier et al. | |
| 2010/0208016 | A1 | 8/2010 | Menchik et al. | |
| 2011/0077772 | A1* | 3/2011 | Buck | A47L 15/0055 |
| | | | | 700/240 |
| 2011/0289791 | A1 | 12/2011 | Menchik et al. | |
| 2012/0067920 | A1* | 3/2012 | Veltrop | B67D 3/0019 |
| | | | | 222/1 |
| 2013/0032244 | A1* | 2/2013 | Boboltz | B01F 15/0445 |
| | | | | 141/83 |

FOREIGN PATENT DOCUMENTS

| JP | 2002214026 | 7/2002 |
| JP | 2003320679 | 11/2003 |
| JP | 2006103347 | 4/2006 |
| JP | 2007223220 | 9/2007 |
| JP | 2010164722 | 7/2010 |
| JP | 2012020473 | 2/2012 |
| WO | 2004/044816 | 5/2004 |

* cited by examiner

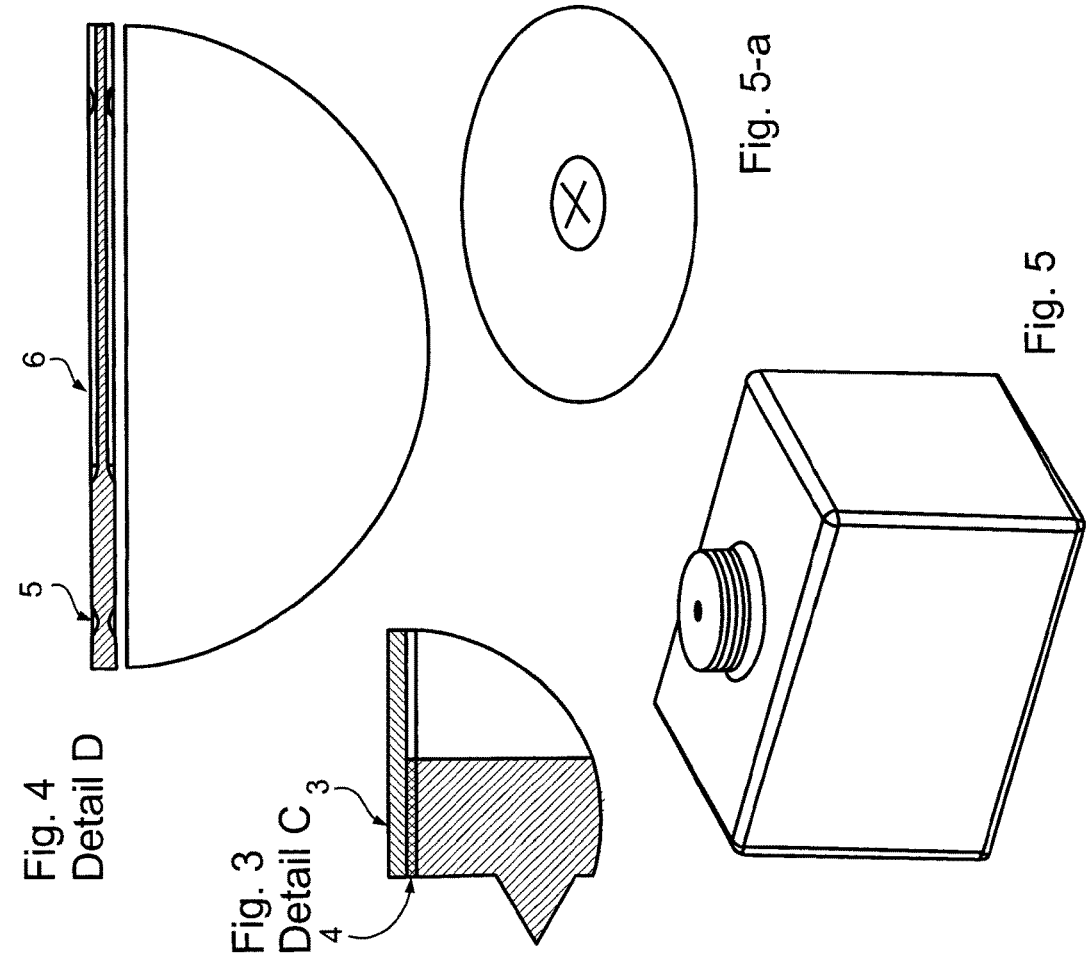
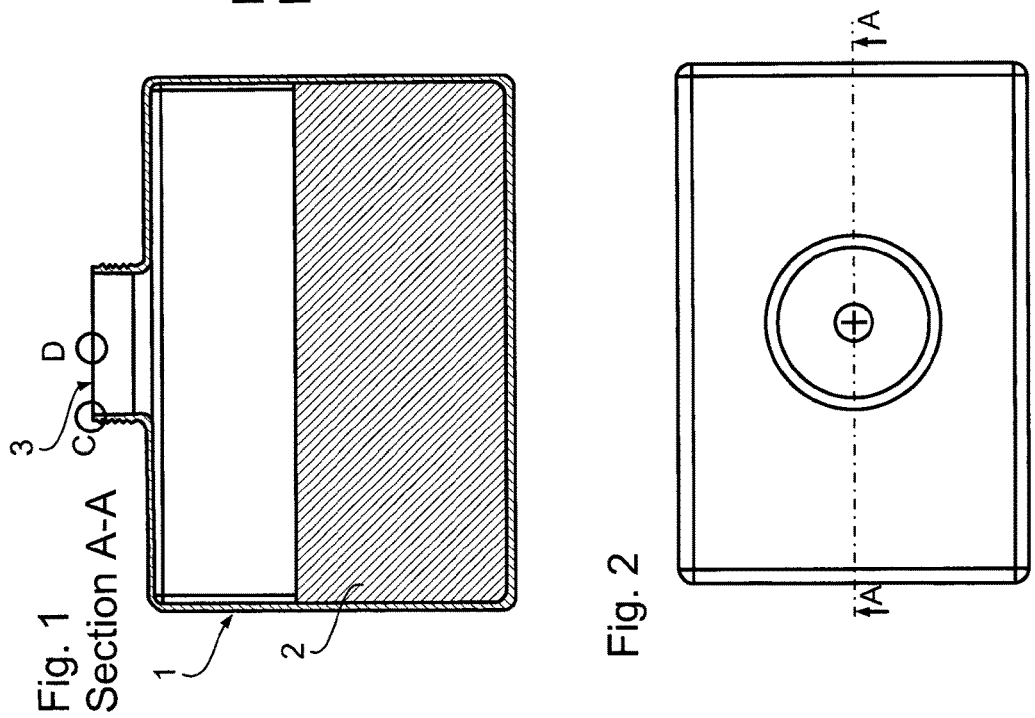

Detail F

Detail E

Section B-B

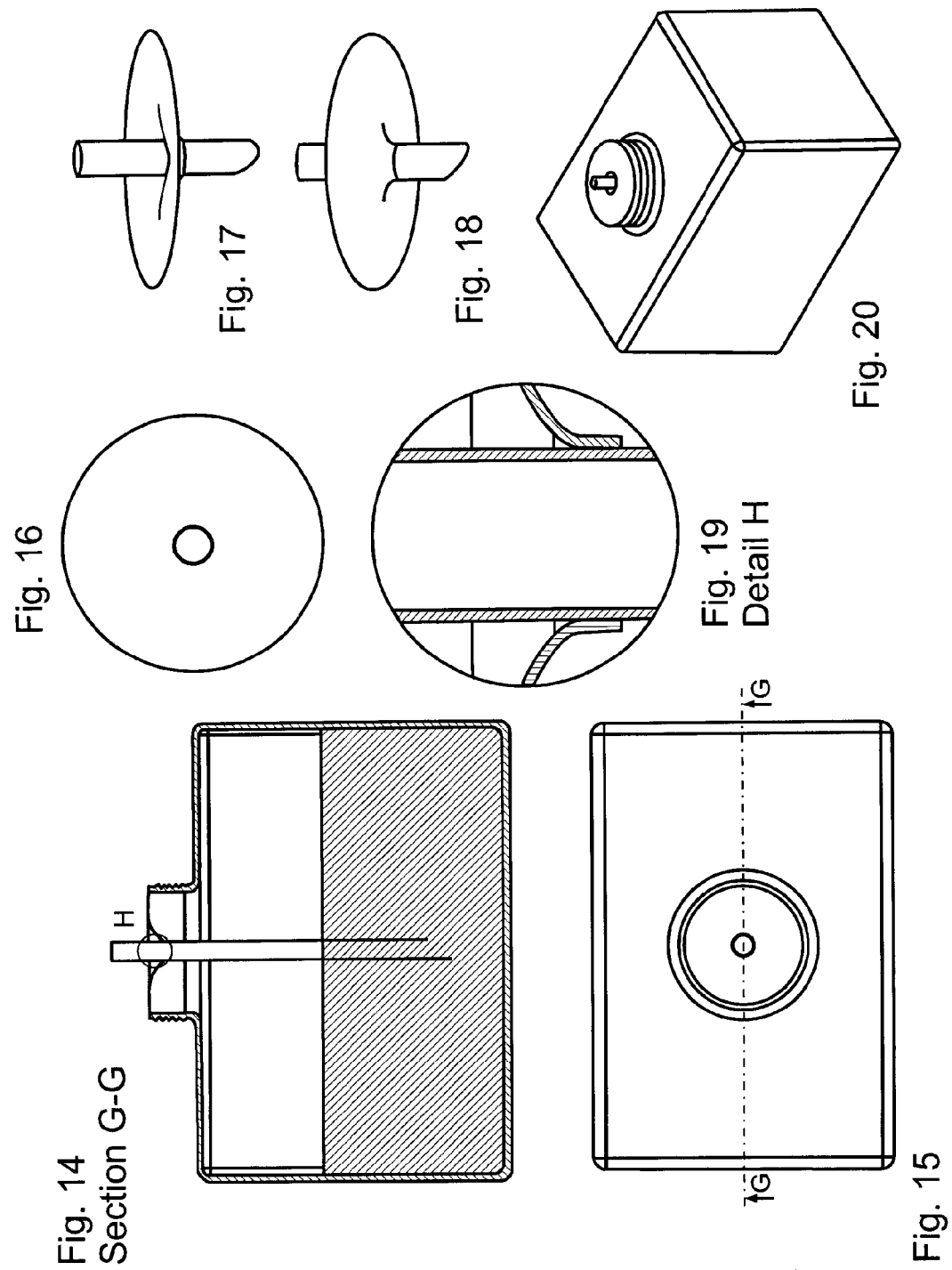

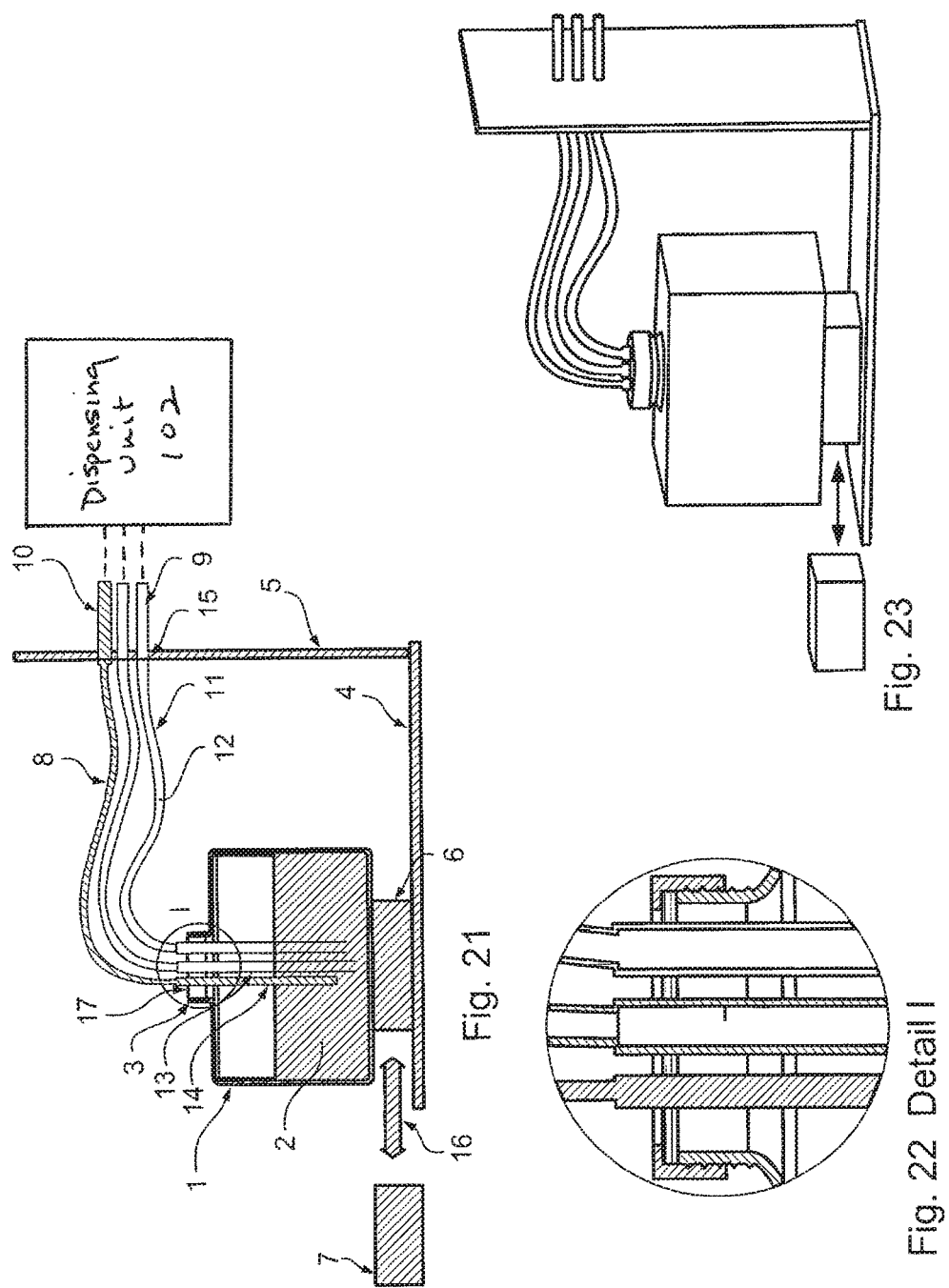

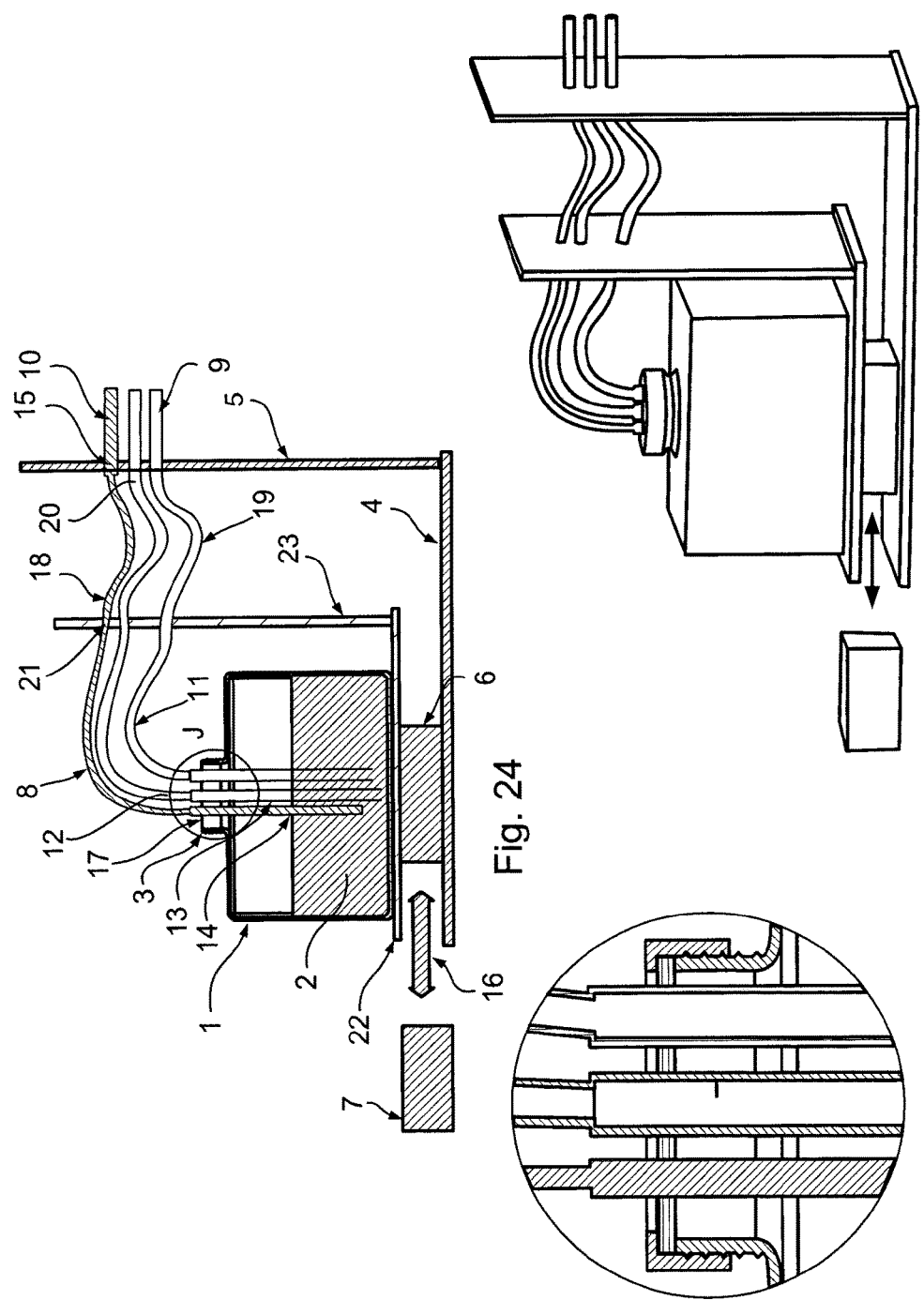

Fig. 28 Detail K

SYSTEM AND METHOD FOR MONITORING WEIGHT OF MATERIAL IN RESERVOIR

BACKGROUND

Many types of sensors are known for measuring the height, weight, level or volume of a material (liquid, solid or gas) in a reservoir such as bubble sensors, pressure sensors, differential pressure sensors, radar sensors, ultrasonic sensors, laser interferometric sensors, linear photo sensors, capacitive and conductive probes, plungers, floaters and scales. Many of these sensors cannot easily be used in industrial applications to monitor the rate of consumption of a material being dispensed from a reservoir when a high degree of precision is required because sensors of the required accuracy may be too expensive, too complicated or too fragile to use in the required applications.

For example, it may be desired to monitor the consumption of 1 kg of material contained in a reservoir to a precision of ±1 gram. If the consumption is monitored by measuring the level of material, the change in level will depend on the reservoir shape and could be maximized by making a very tall reservoir with a narrow cross-section. However this is not always possible due to space constraints for the equipment in the factory. In many cases the reservoir has a small compact shape and a 1 gram change in the quantity of material typically correspond to a change of 0.05 mm or less in the level of material in the reservoir. Measuring such a small change in level may require a very sophisticated and expensive level meter. Additionally, measuring the height or level of material is also vulnerable to a number of other issues: the surface of the liquid may not be flat, and at least three points should be measured (to determine the plane) in case the reservoir is inclined. Furthermore, if the liquid contains chemical agents, it may be necessary to protect the sensor from contact with the chemical to avoid damage or corrosion of the sensing apparatus.

Another type of sensor known to measure the amount of material in a reservoir is a strain meter or scale. This solution has the advantage of placing the sensor outside the reservoir, hence protected from the contents. Additionally, the measurement is then independent of the shape and orientation of the reservoir or the chemical phase of the material contained therein. One example of this type of scale is a load cell such as Vishay Tedea-Huntleigh, Single Point Aluminum, Model 1022, which is based on the Wheatstone bridge principle. This load cell is a low-cost sensor that can measure a change in strain to a high degree of precision. When this sensor is loaded with a weight, there is a vertical deformation in the sensor. The size of the deformation gives a measure of the weight of the load. Using this load cell, for example, the weight of a reservoir like the one in the previous example could be measured to a precision of ±0.01 gram if the reservoir were isolated from the rest of the dispensing apparatus.

Use of a load cell to determine the weight of the contents of a reservoir while material is being dispensed from the reservoir is described in U.S. Pat. No. 7,770,448. The solution described therein solves the problem of measuring the usage of chemicals stored in a canister regardless of chemical type or phase, but it has the drawback that a taring function is needed to allow an operator to tare the empty weight of the canister to account for differences in forces acting on the canister from the connectors that may not be present when the canister is filled prior to insertion in the dispensing apparatus.

If the position of the connectors changes during operation or if the operation is interrupted and the reservoir moved or disconnected and reconnected, the forces exerted on the reservoir by the connectors may change and a discontinuity in the continuous measurement will be produced. This discontinuity may be interpreted as an abrupt change in the measured quantity of material that could be an order of magnitude (or more) higher than the smallest change in material consumption that should be measured. If the position of the connectors changed to exert more force on the reservoir, it would be as if material had been suddenly added to the reservoir. If the position of the connectors changed such that less force was exerted on the reservoir, it would be as material has suddenly been removed from the reservoir. In the latter case, an operator monitoring consumption might erroneously think there had been a leak.

For this reason, the invention described in U.S. Pat. No. 7,770,448 includes a manual taring function; however manual retaring requires operator intervention and thus does not solve the problem if changes in the connector positions occur without the operator's knowledge. Furthermore, such intervention for retaring is tedious and requires stopping the dispensing, which leads to reduced production efficiency. If operating personnel are not attentive, the operation efficiency will be further reduced.

In some cases, the material being consumed is highly valuable. Monitoring may be desired to ensure that material is properly accounted for or does not leak during dispensation, either before the reservoir is inserted in the dispensing device, while the device is in operation, and when the device is stopped and the reservoir removed. In this case, it is important to know how much material is left in the reservoir when it is removed from the dispensing equipment.

The existing solutions do not provide a way to accurately measure consumption of material from a reservoir to a high degree of precision during dispensing, and when calibration of the measurement device cannot be reliably performed.

For these reasons it is necessary to find a solution that allows accurate measurement without requiring manual operating intervention for taring during dispensing operations or while performing maintenance procedures.

BRIEF DESCRIPTION OF THE DRAWINGS

FIG. 1 illustrates a reservoir with a sealed opening according to embodiments;

FIG. 2 illustrates a top view of the reservoir depicted in FIG. 1;

FIG. 3 illustrates a detail of the portion C depicted in FIG. 1;

FIG. 4 illustrates a detail of the portion D depicted in FIG. 1;

FIG. 5 illustrates a perspective view of the reservoir depicted in FIG. 1;

FIG. 5a illustrates a perspective view of a membrane to cover the reservoir opening;

FIG. 14 illustrates a reservoir with a sealed opening according to embodiments;

FIG. 15 illustrates a top view of the reservoir depicted in FIG. 14;

FIG. 16 illustrates a top view of a pierced membrane covering the opening in the reservoir depicted in FIG. 14;

FIG. 17 illustrates a top perspective view of a tube piercing the membrane depicted in FIG. 14;

FIG. 18 illustrates a bottom perspective view of a tube piercing the membrane depicted in FIG. 14;

FIG. 19 illustrates a detail of the portion H depicted in FIG. 14;

FIG. 20 illustrates perspective view of the reservoir depicted in FIG. 14;

FIG. 21 illustrates an embodiment of the reservoir in a system body;

FIG. 22 illustrates a detail of the portion I depicted in FIG. 21;

FIG. 23 illustrates perspective view of the reservoir depicted in FIG. 21;

FIG. 24 illustrates an embodiment of the reservoir in a system body;

FIG. 25 illustrates a detail of the portion J depicted in FIG. 24;

FIG. 26 illustrates perspective view of the reservoir depicted in FIG. 24;

FIG. 28 illustrates a detail of the portion K depicted in FIG. 27;

DETAILED DESCRIPTION

Accurate measurement of the weight of the reservoir will be possible while the dispensing unit is in operation as long as the extraneous forces exerted on the reservoir by the connectors do not vary in amplitude or direction until the dispensing operation is completed. When the connectors are constructed of flexible material, if they are moved or if their position changes within the limits of the elasticity of the length of the tubing, the material will deform in reaction to the external forces, and the change in the force exerted by the tubing on the reservoir will be negligible.

However, since the tubing acts as a conduit for transporting the material being dispensed from the reservoir to the other components of the system, the tubing is often rigid or semi-rigid to prevent kinks which could stop the flow of the material and block the dispensing unit. To allow flexibility in removing the reservoir or performing maintenance on the machine, or for cost reasons, the tubing is frequently semi-rigid so it can be easily displaced, but is only partially able to deform in response to a change in position. In this case, to prevent the tubes from exerting a variable force on the reservoir the forces must either be eliminated or rendered constant.

Using a scale of adequate precision, such as a load cell, the quantity of material in the reservoir can be measured to a high degree of precision without influence from external perturbations when implemented in one of the embodiments described below.

In an exemplary embodiment a scale such as a strain meter or load cell is placed under a reservoir containing material to be dispensed. The material may be ink or a solvent and the reservoir may be contained in a printer. The load cell is connected to a processor that filters and processes the electronic signals from the load cell, converting the signals into a weight measurement which is sent to the dispensing application control logic to record the weight during dispensing. The tubes carrying the material being dispensed into and out of the reservoir in the dispensing apparatus (for example printer) are inserted into the reservoir by one of three methods described below, each of which solve the problem of varying external forces exerted on the reservoir by the connecting tubes. In this way, the recorded weight may be logged by a software application or dispensing control unit controller and optionally displayed to an operator on a screen.

Figures 27, 29:
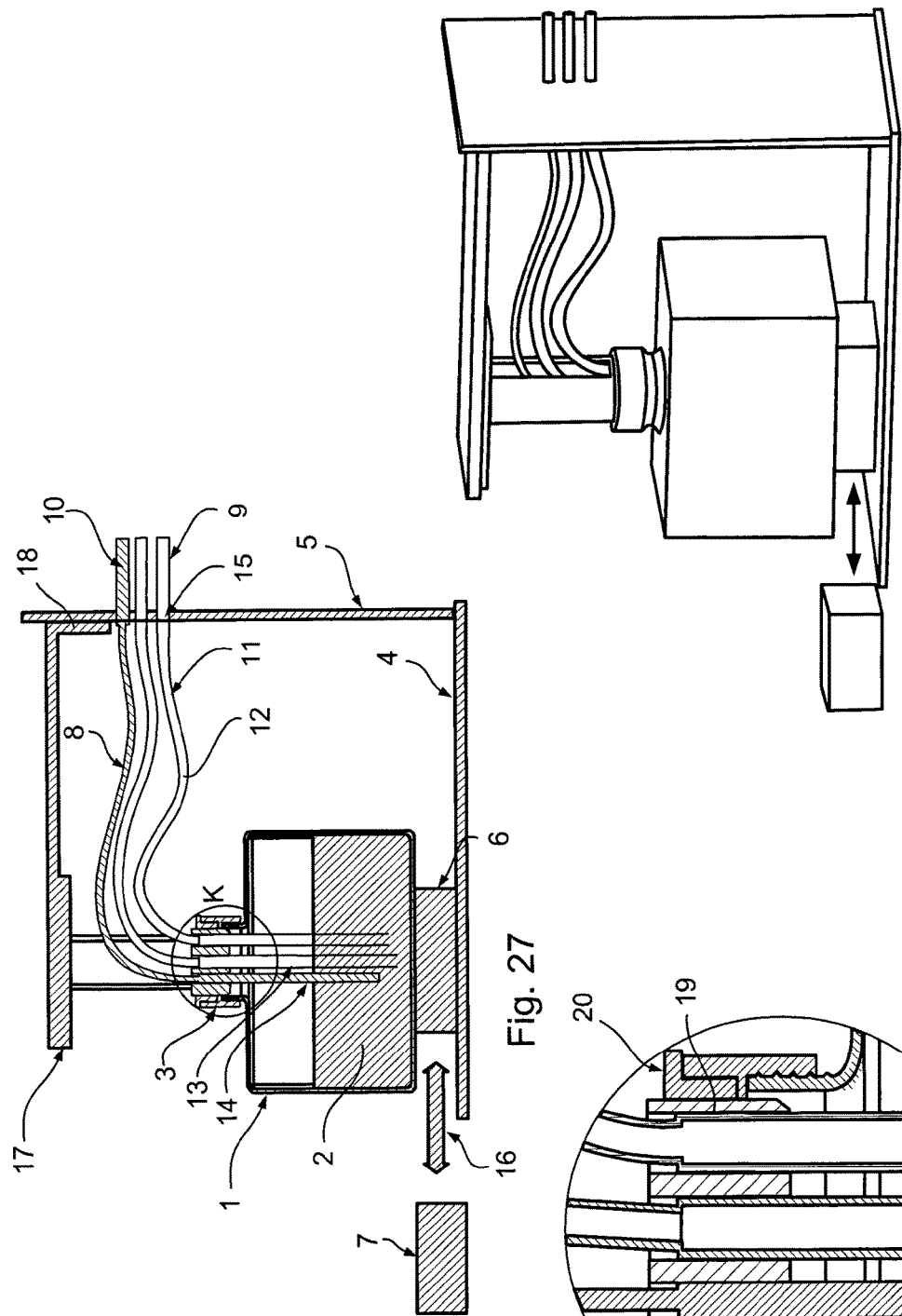
FIG. 27 illustrates an embodiment of the reservoir in a system body.
FIG. 29 illustrates perspective view of the reservoir depicted in FIG. 27.

To solve the problem of variation in forces exerted on the reservoir by the connectors between the reservoir and the dispensing unit, the following three solutions are described:
1. Flexible membrane surrounding the connectors (FIGS. 1-20)
2. Flexible tube sections between the connectors and the dispensing unit (FIGS. 21-26)
3. Sliding Cap (FIGS. 27-29)

1. Flexible Membrane Surrounding the Connectors (All the Numbers in this Paragraph Refer to FIGS. 1-20)

The external forces on the material reservoir may be eliminated by placing the connectors (such as tubes, cables, needles etc.) directly into the open mouth of the reservoir, however if the material is subject to evaporation or sublimation or if the reservoir, also called container herein, must remain closed for other reasons, or if the material is hazardous or subject to alteration, such a solution is not feasible. In this case, the opening of the reservoir may be closed with a seal, membrane, film or foil made of a suitable material (for example, Teflon FEP, PFA and TFE; polypropylene PP, polypropylene copolymer PPCO), which may be of low elasticity, into which the tubes are pushed to insert them in the reservoir and allow dispensing or refilling of the material.

Using a seal has the additional advantage of providing tamper-evidence during distribution and warehousing before the reservoir is placed into the dispensing unit. An attempt to remove or insert material into the reservoir will most likely break the seal, which will leave an obvious trace (hole) in the membrane. FIG. 1 illustrates a reservoir 1 with a sealed opening 3 and containing a material to be dispensed 2.

Figure 6:
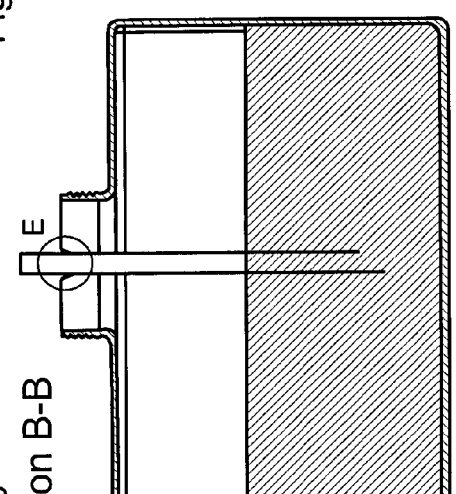
FIG. 6 illustrates a reservoir with a sealed opening according to embodiments.
Figure 7:
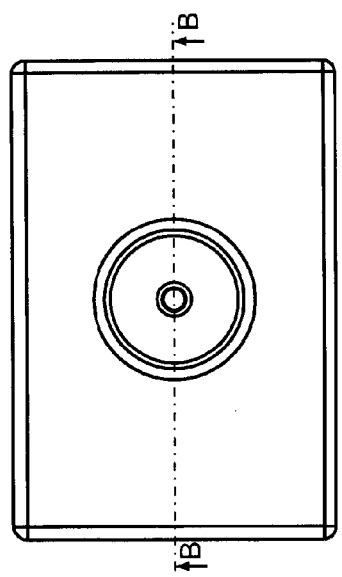
FIG. 7 illustrates a top view of the reservoir depicted in FIG. 6.

The tubes are inserted into the reservoir by pressing them into the membrane as shown in FIG. 6. Only one tube is shown for illustration purposes, but in practice several tubes may be inserted through the membrane if different types of materials must be added or removed. One tube may be used for dispensing the material from the reservoir while another may be used for returning unused material into the reservoir. In some applications, it may be necessary to add solvents to the material to maintain a certain viscosity and an additional tube may be required in that case. Other types of connectors may be also inserted into the reservoir through the membrane, such as cables or conduits connected to sensors placed in the reservoir for transmitting data or other signals, such as electrical signals, to and from the sensor and the control unit of the dispensing apparatus.

The membrane 3 is fixed to the mouth of the reservoir by gluing or a method of sealing such as heat or ultrasonic sealing. FIG. 3 shows an expanded view of the edge of the membrane 2 attached to the reservoir with a seal 3 across the sides of the opening. The chosen method of sealing will produce a seal that is strong enough to withstand the force applied when the membrane is perforated by the tubes so that they can be inserted without pulling the seal off the sides of the opening. A tight seal also ensures that the seal does not break if the container is turned upside down. If the material being dispensed is corrosive, the membrane may be made of a material that is resistant to the corrosive effects of the material contained in the reservoir in order to avoid being weakened or damaged by coming in contact with the material inside. For example, many industrial solvents are known to be damaging to some types of materials typically used as sealing membranes.

Figure 9:
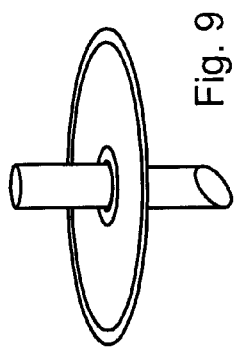
FIG. 9 illustrates a top perspective view of a tube piercing the membrane depicted in FIG. 8.
Figure 10:
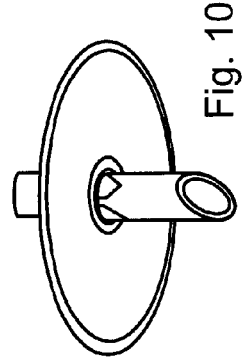
FIG. 10 illustrates a bottom perspective view of a tube piercing the membrane depicted in FIG. 8.
Figure 13:
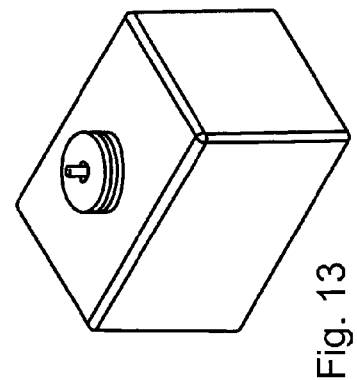
FIG. 13 illustrates perspective view of the reservoir depicted in FIG. 6.
Figure 8:
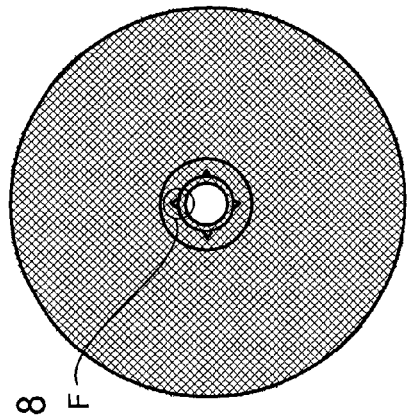
FIG. 8 illustrates a perspective view of a membrane.
Figure 11:
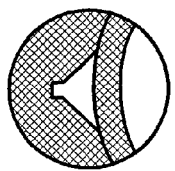
FIG. 11 illustrates a detail of the portion F depicted in FIG. 8.
Figure 12:
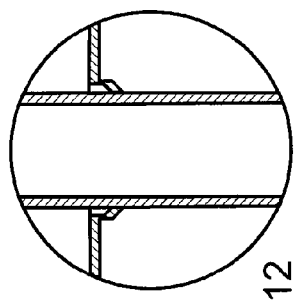
FIG. 12 illustrates a detail of the portion E depicted in FIG. 6.

The end of the tube may be designed to have a special shape for piercing as shown in FIGS. 9 and 10 or may be fitted with special cap, for example having a sharp metal point or similar shape, to aid the insertion. When the tube is inserted into the reservoir, the membrane is partially torn allowing the tube to plunge into the material in the container. The opening may have a characteristic pattern, such as the diamond shape shown in FIG. 8 where the circular tube touches the centers of the sides of the diamond. In this example, the seal is not perfect, and a small amount of air may pass in and out of the reservoir through gaps in the corners, as shown in FIG. 11.

In one embodiment, the material of the membrane is designed to include marks indicating where the tubes should be inserted. The area of the membrane around the mark may be thinner than the surrounding material to control the position of the tearing so that the entire membrane is not torn when the tubes are pressed into it as shown in FIG. 2. In one embodiment the marked area includes a cross-shape surrounded by a circular ring, which is pre-formed during manufacturing of the membrane. The cross-section of the prepared membrane is shown in FIG. 4, where the long bar of the cross is indicated 6. The thinner section of the ring 5 limits the tearing so that when the tube is pressed into the cross, the membrane will tear, but the tear stops when it reaches the circular ring to avoid destroying the membrane entirely.

The tube is supported by the static friction between the tube and the membrane. As long as the applied force on the tubing is insufficient to overcome the static friction coefficient between the tube and the membrane, the material of the membrane will deform slightly to compensate and the tube will remain in place. If the force becomes larger than can be absorbed by the deformation of the material and larger than the static coefficient of friction, the tube will slip, alleviating the additional forces on the tube until the coefficient of friction is again reached. The variable extraneous forces are thus substantially eliminated by this stick-slip phenomenon.

If a tighter seal is required around the tubes when they are inserted into the reservoir through the membrane, then the membrane may be made of an elastic material that will attempt to return to its initial shape, forming a tight seal around the tube once it is pressed into the reservoir. The deformation of the elastic membrane in response to the varying forces from the connecting tubes attenuates the influence of the varying forces on the weight measured by the load cell.

This is shown in FIGS. 14-19. The tubes are pressed into the elastic membrane, which then forms a seal around the tube as it attempts to return to its initial shape following piercing by the tube (FIG. 19). As the forces on the tube vary, the membrane will deform either up or down, depending on the variation in forces (FIGS. 17-18). The vertical component of the force exerted on the reservoir will be decomposed into a vertical and horizontal component as the membrane is deformed, so that the vertical force on the reservoir affecting the load cell measurement will be attenuated by a factor proportional to the length of the lever arm, i.e. the radius of the membrane. The resulting difference in the vertical component of the force applied by the membrane to the plunging tubes when the membrane is displaced by its minimum and maximum amounts is inferior to the force applied to the weight sensor when a quantity of material equivalent to the desired measurement accuracy is added or removed.

The previous observations concerning the properties of the membrane apply: the material is fixed to the mouth of the reservoir by gluing or a method of sealing such as heat or ultrasonic sealing that will support the force applied when piercing the membrane as well as the weight of the material inside if the reservoir is turned upside down. If the material being dispensed is corrosive, the material of the membrane is chosen to be resistant to damage by the type of material contained in the reservoir to avoid being weakened or damaged by coming in contact with the contents. However in this case the elastic membrane will tear when the tubes are inserted into the reservoir, but the membrane will deform almost completely without breaking under a variation in pressure from the connecting tubes.

2. Flexible Tube Sections Between the Connectors and the Dispensing Unit (All the Numbers in this Paragraph Refer to FIGS. 21-26)

As shown in FIG. 21 and FIG. 24, a weight sensor 6, for example a load cell, is used to measure the weight of the reservoir 1, the contents of the reservoir 2, the reservoir cap 3, the tube holder 17, the plunged tubes 13, the plunged sensor 14, the flexible tubes 11, the tube contents 12, the sensor wire 8 and other parts related to the dispensing unit assembly. The weight sensor is connected to the controller 7 using a data link 16. The material being dispensed 2 from the reservoir 1 could be of any type or phase (gas, liquid or solid) including: Inks, solvents or a mixture of both.

When all the material has been dispensed, the empty reservoir may be replaced or refilled. The replacement or refilling operation typically requires removing the reservoir cap 3, and replacing the reservoir 1 with another container. During removal, exchange, refill, inspection or other manipulation to the reservoir 1, reservoir cap 3, plunged tubes 13, plunged sensor 14 or any parts that weigh on the sensor 6, the force applied on the reservoir by the tubes 11 and cable 8 may vary. This variation is due partially to movement of the tubes 11 and the cable 8, which are not at exactly the same position before and after the manipulation. In addition, the tubes 11 and/or cable 8 are made of flexible or partially flexible materials that will allow manipulation during maintenance without breaking, while preventing kinks that could block the flow of material being dispensed from the reservoir. Because of these properties, the tubes 11 and cable 8 apply an unwanted variable force to the cap 3 and therefore to the weight sensor 6, which may register a variation in weight despite the fact that the amount of material being dispensed 2 from the reservoir remains the unchanged. The movement of the extremity of the weight sensor 6 is typically less than a few mm at full load.

To overcome described problem, the tubes 11 and cable 8 may be made of very flexible materials that generate a very low force when bent. Due to the small movement of the sensor extremity 6, the amount of unwanted force applied to the cap 3 that is dependent on the tube and/or cable position is reduced.

In this embodiment (FIGS. 21-23), the first extremity of the flexible tubes 11 and cable 8 are connected to the plunged tubes 13 and sensor 14 using for example standard tubing or cable fixtures. The second extremity of the flexible tubes 11 and cable 8 are connected to the rigid tubes 9 and cable 10, both tied to the tubing holder 5 using tube or cable fixture mechanisms 15 such as, but not restricted to, a hole that crimps the tubes together or off the shelf standard tubing or cable coupling systems. The second extremity of the rigid tubes 9 and cable 10 are usually connected with a dispensing unit 102, for example a printer or printer head. The fixtures 15 transmit the force applied by the tubes 9 or cable 10 to the tube holder 5, which is connected to the system body 4. The length, orientations and position of the tubes 11 and cable 8 remain approximately the same during removal, exchange, refill, inspection or other manipulation of the reservoir 1, reservoir cap 3, plunged tubes 13 or sensor 14 and the flexibility of the tubes 11 and cable 8 materially reduces variation in the resulting force before and after any manipulation.

In another embodiment (FIGS. 24-26), the first extremity of the flexible tubes 11 and cable 8 are connected to the plunged tubes 13 and sensor 14 using for example standard tube or cable fixtures. The second extremity of the tubes 11 and cable 8 are connected to the flexible tubes 19 and flexible cable 18, both tied to the container holder 22,23 using tube or cable fixture mechanisms 21 such as, but not restricted to, a hole that crimps the tubes together or off the shelf standard tube or cable coupling systems. The other extremity of the flexible tubes 19 and flexible cable 18 are connected to the rigid tubes 9 and cable 10, both tied to the tube holder 5 using tube or cable fixture mechanisms 15 such as, but not restricted to, a hole that crimps the tubes together or off the shelf standard tube or cable coupling systems.

The fixtures 15 transmit the force applied by the tubes 9 or cable 10 to the tube holder 5, which is connected to the system body 4. The length, orientations and position of the tubes 19 and cable 18 remain the same during removal, exchange, refill, inspection or other manipulation of the reservoir 1, reservoir cap 3, plunged tubes 13 or sensor 14 and the flexibility of the tubes 19 and cable 18 material reduces variation in the resulting force due to the small movement of the reservoir holder 22,23 relative to the system body 4.

The forces applied to cap 3 by the cable 8, tubes 11 and the material contained therein 12 do not interfere with the measurement made by the weight sensor 6 because the concerning force loops do not pass through the weight sensor 6 but are contained within the reservoir holder 22,23. Therefore, the only external forces applied to the parts measured by the weight sensor 6 are the weight of the material being dispensed plus the force applied by the flexible tubes 19 and cable 18. Because theses tubes and sensor are never manipulated and only move slightly, the force applied by them is reproducible and does not vary when manipulations to the reservoir 1, reservoir cap 3, plunged tubes 13 or sensor 14 are performed.

3. Sliding Cap (All the Numbers in this Paragraph Refer to FIGS. 27-29)

In another embodiment, a weight sensor 6 is used to measure the weight of the reservoir 1, the material contained in the reservoir 2, the reservoir cap 3, and the cylindrical smooth dry bearing 20.

In a further embodiment, the plunged tubes 13 and the plunged sensor 14 are rigidly held by the tube holder 17. The tube holder 17 is further rigidly attached to the tube holder 5. The first extremity of the tubes 11 and cable 8 is connected to the plunged tubes 13 and sensor 14 using for example standard tube or cable fixtures. The second extremity of the tubes 11 and cable 8 are connected to the rigid tubes 9 and cable 10, both tied to the tube holder 5 using tube or cable fixture mechanisms 15 such as, but not restricted to, a hole that crimps the tubes together or off the shelf standard tube or cable coupling systems. The fixtures 15 transmit the force applied by the tubes 9 or cable 10 to the tube holder 5 connected to the system body 4. The weight sensor 6 is connected to the controller 7 using a data link 16. The material being dispensed 2 from the reservoir 1 could be of any type or phase including: Inks, solvents or a mixture of both.

The tube holder 17 is not attached to the cylindrical smooth dry bearing 20, which is attached firmly to the cap 3. The cylindrical smooth dry bearing 20 is free to slide vertically along the tube holder 17 and in rotation around it.

A weight placed on or removed from the weight sensor 6 results in a vertical deformation that is proportional to the amount of the weight. During the emptying (or the filling) of the reservoir 1, through the plunged tubes 13, the vertical position of the reservoir 1 thus varies. When the vertical position of the reservoir 1 varies, the cylindrical smooth dry bearing 20 (in the reservoir cap 3) slides freely (vertically, and in rotation) along (and around) the tube holder 17.

In this way, during removal, exchange, refill, inspection or other manipulation of the reservoir 1 and the reservoir cap 3, or any parts that weigh on the sensor 6, no force is applied by the plunged tubes 13, plunged sensor 14, the tubes 11 and cable 8 because the plunged tubes 13, plunged sensor 14, the tubes 11 and cable 8 are all attached firmly and rigidly to the tube holder 17, itself attached firmly to the tube holder 5, itself connected rigidly to the system body 4.

The invention claimed is:

1. A dispensing apparatus for measuring a quantity of material to be dispensed, the dispensing apparatus having:
   a dispensing unit for dispensing at least part of the material;
   a reservoir containing the material to be dispensed;
   a tubing holder located between the reservoir and the dispensing unit;
   connectors tied to the tubing holder;
   a scale under the reservoir, the scale being for connection to a controller for processing electronic signals from the scale and for converting the signals into a weight measurement; and
   plunged tubes and a plunged sensor inserted into the reservoir allowing the tubes and the sensor to plunge into the material in the container, the plunged tubes carrying material into and from the reservoir,
   wherein the plunged tubes and the plunged sensor being inserted into the reservoir by one of:
   through a flexible membrane fixed to a mouth of the reservoir, or
   through a reservoir cap that slides along the tubing holder;
   or wherein the dispensing apparatus further includes flexible tube sections extending between the reservoir and the connectors, wherein first extremities of the flexible tube sections are connected to the plunged tubes and the plunged sensor, and second extremities of the flexible tube sections are connected to first extremities of the connectors tied to the tubing holder.

2. Method of making a dispensing apparatus as claimed in claim 1 for measuring a quantity of material to be dispensed, the method including:
   placing the scale under the reservoir, the scale being for connection to a processor for processing electronic signals from the scale and for converting the signals into a weight measurement; and inserting plunged tubes and a plunged sensor into the reservoir allowing the tubes and the sensor to plunge into the material in the container, the tubes carrying material into and from the reservoir, wherein inserting the plunged tubes and the plunged sensor into the reservoir takes place by one of the following:

through a flexible membrane surrounding the connectors, or through a reservoir cap, the cap sliding along the tubing holder;

or wherein the method further includes connecting the first extremities of the flexible tube sections to the plunged tubes and the plunged sensor, and the second extremities of the flexible tube sections to the first extremities of the connectors tied to the tubing holder.

3. Method as claimed in claim 2, the tubes being inserted into the reservoir with the flexible tube sections between the connectors and the dispensing unit, the reservoir including a cap and the dispensing apparatus including at least one of a tubing holder and a reservoir holder.

4. Method as claimed in claim 3, wherein the cap includes plunged tubes, one extremity of the tube sections being connected to the plunged tubes.

5. Method as claimed in claim 3, a second extremity of the tube sections being connected to rigid tubes tied to the tubing holder.

6. Method as claimed in claim 2, wherein the dispensing apparatus includes a tubing holder and a reservoir holder, the reservoir holder being connected to the tubing holder by the scale.

7. Method as claimed in claim 6, wherein the flexible tube sections are tied to the tubing holder, a second extremity of the tube sections being connected to flexible tubes tied to the reservoir holder.

8. Method as claimed in claim 2, the tubes being inserted into the reservoir through the flexible membrane, wherein the membrane is fixed to a mouth of the reservoir with a seal across the thickness of the sides of the mouth.

9. Method as claimed in claim 2, the tubes being inserted into the reservoir through the flexible membrane, the tubes having one of a shape for piercing the membrane and a cap including a sharp point for piercing the membrane.

10. Method as claimed in claim 2, the tubes being inserted into the reservoir through the flexible membrane, wherein the membrane includes marks indicating where the tubes are inserted.

11. Method as claimed in claim 10, wherein the membrane around the marks is thinner than the surrounding membrane material.

12. Method as claimed in claim 2, wherein the material is ink or a solvent and the reservoir is contained in a printer.

13. Method as claimed in claim 2, wherein the scale is a load cell.

14. Method as claimed in claim 13, wherein the load cell is connected to a processor that filters and processes the electronic signals from the load cell, converting the signals into a weight measurement which is sent to a dispensing application control logic to record the weight during dispensing.

15. Method as claimed in claim 2, wherein the tubes are inserted into the reservoir through the reservoir cap, a cylindrical smooth dry bearing being attached firmly to the reservoir cap.

16. Method as claimed in claim 15, wherein the tubes are inserted into the reservoir through the reservoir cap, the reservoir further including a tube holder rigidly holding plunged tubes and the cylindrical smooth dry bearing being free to slide vertically along the tube holder.

17. Method as claimed in claim 16, wherein the cylindrical smooth dry bearing is free to slide in rotation around the tube holder.

18. Method as claimed in claim 2, wherein the tubing holder is connected to a body of the dispensing apparatus.

19. A method for monitoring consumption of material with the apparatus as claimed in claim 1, the method comprising:

dispensing at least part of the material contained in a reservoir; and processing electronic signals from a scale under the reservoir and converting the signals into a weight measurement.

20. The method as claimed in claim 19, wherein the consumption of material is determined while the dispensing unit is in operation.

21. A dispensing apparatus for measuring a quantity of material to be dispensed, the dispensing apparatus having:

a dispensing unit for dispensing at least part of the material;

a reservoir containing the material to be dispensed;

a tubing holder located between the reservoir and the dispensing unit; connectors tied to the tubing holder;

a scale under the reservoir, the scale being for connection to a controller for processing electronic signals from the scale and for converting the signals into a weight measurement; and plunged tubes and a plunged sensor inserted into the reservoir allowing the tubes and the sensor to plunge into the material in the container, the plunged tubes carrying material into and from the reservoir, wherein, at least one of:

the plunged tubes and the plunged sensor are inserted into the reservoir by one of:

through a flexible membrane fixed to a mouth of the reservoir, or through a reservoir cap that slides along the tubing holder; and the dispensing apparatus further includes flexible tube sections extending between the reservoir and the connectors, wherein first extremities of the flexible tube sections are connected to the plunged tubes and the plunged sensor, and second extremities of the flexible tube sections are connected to first extremities of the connectors tied to the tubing holder.

* * * * *